(12) United States Patent
Wiemker et al.

(10) Patent No.: US 9,349,177 B2
(45) Date of Patent: May 24, 2016

(54) EXTRACTING BULLOUS EMPHYSEMA AND DIFFUSE EMPHYSEMA IN E.G. CT VOLUME IMAGES OF THE LUNGS

(71) Applicant: KONINKLIJKE PHILIPS N.V., Eindhoven (NL)

(72) Inventors: Rafael Wiemker, Kisdorf (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/382,896

(22) PCT Filed: Mar. 22, 2013

(86) PCT No.: PCT/IB2013/052279
§ 371 (c)(1),
(2) Date: Sep. 4, 2014

(87) PCT Pub. No.: WO2013/140374
PCT Pub. Date: Sep. 26, 2013

(65) Prior Publication Data
US 2015/0036908 A1 Feb. 5, 2015

Related U.S. Application Data

(60) Provisional application No. 61/614,718, filed on Mar. 23, 2012.

(51) Int. Cl.
*G06T 7/00* (2006.01)
*G06T 15/08* (2011.01)
*G06T 19/20* (2011.01)
*G06K 9/46* (2006.01)

(52) U.S. Cl.
CPC ............ *G06T 7/0012* (2013.01); *G06K 9/4604* (2013.01); *G06T 15/08* (2013.01); *G06T 19/20* (2013.01); *G06T 2200/24* (2013.01); *G06T 2207/10081* (2013.01); *G06T 2207/30061* (2013.01); *G06T 2210/41* (2013.01); *G06T 2219/2012* (2013.01)

(58) Field of Classification Search
None
See application file for complete search history.

(56) References Cited

U.S. PATENT DOCUMENTS

2004/0101176 A1* 5/2004 Mendonca ............ G06T 7/0012
  382/128
2004/0101182 A1* 5/2004 Miller .................... G06T 7/602
  382/131

(Continued)

OTHER PUBLICATIONS

Blechschmidt, R. A., et al.; Automated CT Image Evaluation of the Lung: A Morphology-Based Concept; 2001; IEEE Trans. on Medical Imaging; 20(5)434-442.

(Continued)

*Primary Examiner* — Bhavesh Mehta
*Assistant Examiner* — Narek Zohrabyan (57) ABSTRACT

An processor (118) includes a bullous emphysema identifier (206) that processes voxels of the volumetric image data and identifies voxels corresponding to bullous emphysema, a two dimensional projection image generator (206) that generates a 2D bullous emphysema projection image based on the voxels corresponding to bullous emphysema, wherein an intensity of a contour of a bulla in the 2D bullous emphysema projection image is based on a size of the bulla, and a feature highlighter (210) that highlights the bullous emphysema in the 2D bullous emphysema projection image using second first indicia.

20 Claims, 5 Drawing Sheets

(56) References Cited

U.S. PATENT DOCUMENTS

| | | | | |
|---|---|---|---|---|
| 2005/0105788 A1* | 5/2005 | Turek | G06F 19/321 | 382/131 |
| 2007/0053560 A1* | 3/2007 | Miller | G06T 7/0012 | 382/128 |
| 2009/0129641 A1* | 5/2009 | Zhou | G06T 7/0081 | 382/128 |
| 2009/0257627 A1* | 10/2009 | Nay | G06T 7/0081 | 382/128 |
| 2011/0286630 A1* | 11/2011 | Harder | G06T 15/08 | 382/103 |
| 2013/0169640 A1* | 7/2013 | Sakuragi | G06T 15/20 | 345/424 |
| 2014/0219416 A1* | 8/2014 | Kimoto | G06T 7/0081 | 378/8 |
| 2015/0005659 A1* | 1/2015 | Masumoto | A61B 6/032 | 600/538 |

OTHER PUBLICATIONS

Champion, J. K., et al.; Bilateral thoracoscopic stapled volume reduction for bullous v. diffuse emphysema; 1998; Surgical Endoscopy; 12(4)338-341.

Correa, C. D., et al.; Size-based Transfer Functions: A New Volume Exploration Technique; 2008; IEEE Trans. on Visualization and Computer Graphics; 14(6)1380-1387.

Kuhnigk, J. M., et al.; Informatics in Radiology (infoRAD) New Tools for Computer Assistance in Thoracic CT; Part 1. Functional Analysis of Lungs, Lung Lobes, and Bronchopulmonary Segments; 2005; RadioGraphics; 25(2)525-536.

Mura, M., et al.; Bullous emphysema versus diffuse emphysema: a functional and radiologic comparison; 2005; Respiratory Medicine; 99:171-178.

Prasad, M., et al.; Multi-level classification of emphysema in HRCT lung images; 2009; Pattern Anal. Applic.; 12:9-20.

Prasad, M., et al.; Multi-level Classification of Emphysema in HRCT Lung Images Using Delegated Classifiers; 2008; MICCAI; Part I; LNCS 5241; pp. 59-66.

Wesarg, S., et al.; Structure Size Enhanced Histogram: A Transfer Function for 3D Volume Visualization; 2009; Bildverarbeitung fur die Medizin; Brauer, et al. (Eds.); Springer; pp. 16-20.

Yamaguchi, K., et al.; Computed tomographic diagnosis of chronic obstructive pulmonary disease; 2000; Current Opinion in Pulmonary Medicine; 6(2)92-98.

* cited by examiner

EXTRACTING BULLOUS EMPHYSEMA AND DIFFUSE EMPHYSEMA IN E.G. CT VOLUME IMAGES OF THE LUNGS

CROSS REFERENCE TO RELATED APPLICATIONS

This application is a national filing of PCI application Serial No. PCT/IB2013/052279, filed Mar. 22, 2013, published as WO 2013/140374 A2 on Sep. 26, 2013, which claims the benefit of U.S. provisional application Ser. No. 61/614,718 filed Mar. 23, 2012, which is incorporated herein by reference.

The following generally relates to imaging and more particularly to volume rendering such as rendering images of emphysema subtypes and/or other features of interest, and is described in connection with computed tomography (CT). However, the following is also amenable to other imaging modalities.

A CT scanner includes a rotating frame and a stationary frame that rotatably supports the rotating frame. An x-ray tube is supported by a rotating frame. The rotating frame and hence the x-ray tube rotate around an examination region, and the x-ray tube emits radiation that traverses the examination region and a subject and/or object disposed therein. A radiation sensitive detector is located opposite the x-ray tube, across the examination region, and detects radiation that traverses the examination region and the subject and/or object. The radiation sensitive detector generates a signal indicative of the detected radiation. A reconstructor reconstructs the signal and generates volumetric image data indicative of the subject and/or object. An image processor can be used to process the volumetric image data and generate one or more images indicative of the subject and/or object.

Such scanning has included scanning the lungs of a subject, for example, in connection with a subject with emphysema, etc. Generally, emphysema is a widespread and life-threatening disease, with incidence rising worldwide. Two important subtypes are diffuse emphysema (DE) and bullous Emphysema (BE). These subtypes are medically treated differently. Bullae are bubble like structures filled with air, which do not contribute to the lung function of gas exchange, and the inspiratory impairment increases with bullae size. Emphysema renderings typically reveal the diffuse emphysema subtype. The standard is minimum intensity projection (mIP or minIP) or a mean projection (averaging) of the voxel values below a certain threshold in Hounsfield Units (HU). The rendering has been based on voxel intensities.

Visually apparent features are readily observable and can be highlighted. However, irregularly shaped features that are not visually distinct may be occluded and/or overlooked. Therefore, there is an unresolved need for other approaches for visualizing emphysema subtypes.

Aspects described herein address the above-referenced problems and others.

In one aspect, an image data processor includes a bullous emphysema identifier that processes voxels of volumetric image data and identifies voxels corresponding to bullous emphysema. The image data processor further includes a two dimensional projection image generator that generates a 2D bullous emphysema projection image based on the voxels corresponding to bullous emphysema, wherein an intensity of a contour of a bulla in the 2D bullous emphysema projection image is based on a size of the bullous. The image data processor further includes a feature highlighter that highlights the bullous emphysema in the 2D bullous emphysema projection image using first different indicia.

In another aspect, a method includes identifying voxels of volumetric image data corresponding to bullous emphysema. The method further includes generating a 2D bullous emphysema projection image based on the voxels corresponding to bullous emphysema, wherein an intensity of a contour of a bulla in the 2D bullous emphysema projection image is based on a size of the bullous. The method further includes highlighting the bullous emphysema in the 2D bullous emphysema projection image using first indicia.

In another aspect, a computer readable storage medium is encoded with computer readable instructions. The instructions, when executed by a processor, cause the processor to: identify voxels of volumetric image data corresponding to bullous emphysema, generate a 2D bullous emphysema projection image based on the voxels corresponding to bullous emphysema wherein an intensity of a contour of a bulla in the 2D bullous emphysema projection image is based on a size of the bullous, and highlight the bullous emphysema in the 2D bullous emphysema projection image using first indicia.

The invention may take form in various components and arrangements of components, and in various steps and arrangements of steps. The drawings are only for purposes of illustrating the preferred embodiments and are not to be construed as limiting the invention.

The following generally describes an approach in which a rendering of diffuse emphysema and a rendering of bullous emphysema are mapped to different visual indicia (e.g., color) and combined to form a single composite image, where the rendered intensity of the bullae are based on both local voxel intensity and local bullae size.

Figure 1:
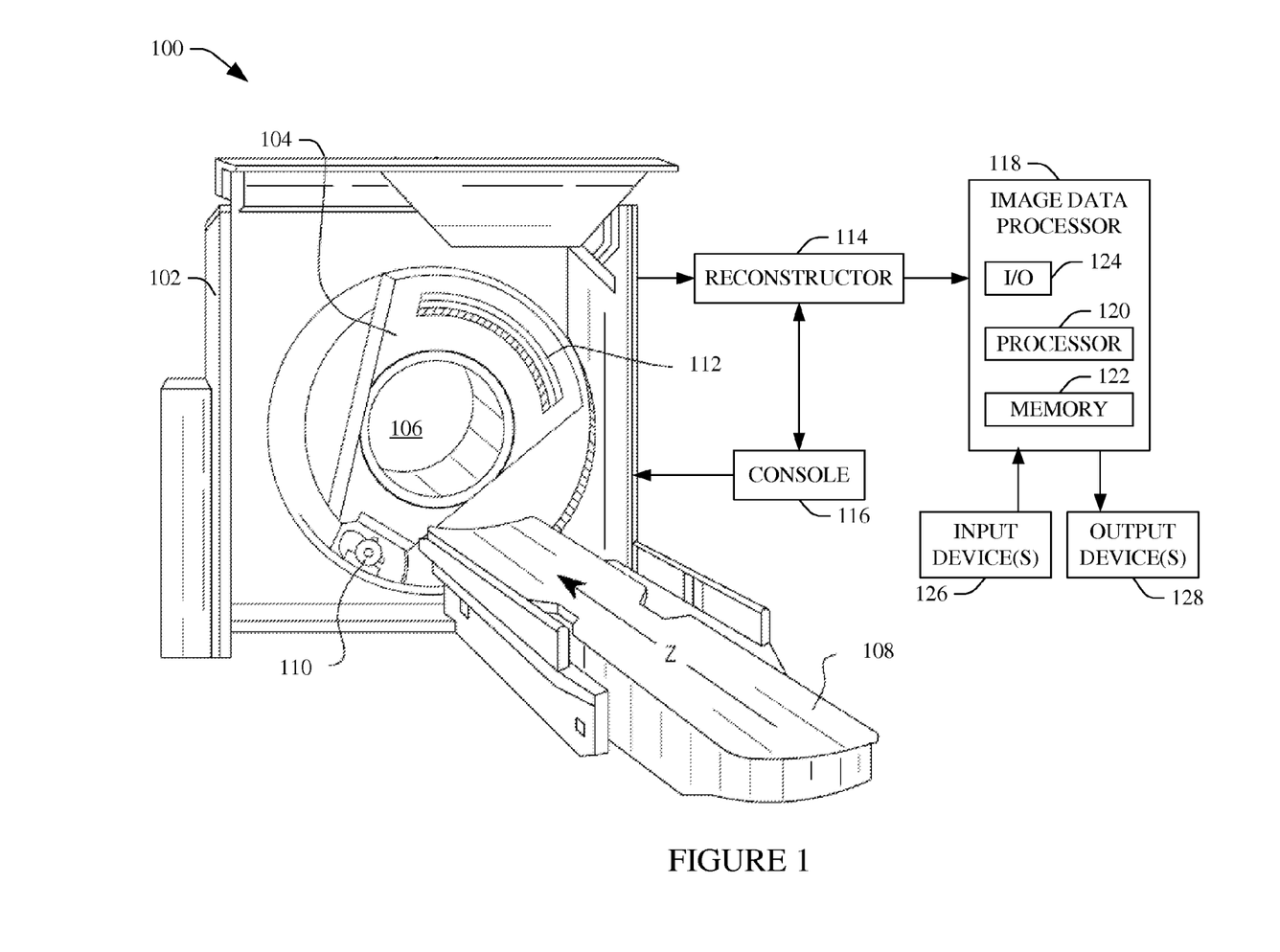
FIG. 1 schematically illustrates an imaging system in connection with an image data processor configured to at least generate a color coded composite image showing both diffuse and bullous emphysema.

Initially referring to FIG. 1, an imaging system 100 such as a CT scanner is illustrated. The imaging system 100 includes a generally stationary gantry 102 and a rotating gantry 104, which is rotatably supported by the stationary gantry 102 and rotates around an examination region 106 about a z-axis. A subject support 108, such as a couch, supports an object or subject in the examination region 106.

A radiation source 110, such as an x-ray tube, is rotatably supported by the rotating gantry 104, rotates with the rotating gantry 104, and emits radiation that traverses the examination region 106. A radiation sensitive detector array 112 subtends an angular arc opposite the radiation source 110 across the examination region 106. The radiation sensitive detector array 112 detects radiation traversing the examination region 106 and generates a signal indicative thereof for each detected photon.

A reconstructor 114 reconstructs the projection, generating volumetric image data indicative of a scanned portion of a subject or object located in the imaging region 106. A general-purpose computing system or computer serves as an operator console 116. The console 116 includes a human readable output device such as a monitor and an input device such as a keyboard, mouse, etc. Software resident on the console 116 allows the operator to interact with and/or operate the scanner 100 via a graphical user interface (GUI) or otherwise.

An image data processor 118 includes at least one processor 120 that executes at least one computer readable instruction stored in computer readable storage medium, such as physical memory 122 or other non-transitory storage medium. The processor 120 may also executes one or more computer readable instructions carried by a carrier wave, a signal or other transitory medium. Input/output (I/O) 124 is configured to receive information from one or more input devices 126 (e.g., a keyboard, a mouse, etc.) and/or convey information (e.g., a Graphical User Interface (GUI) and information therein in display regions) to or more output devices 128 (e.g., a monitor, a filmer, portable memory, etc.).

The image data processor 118, based on at least one instruction, processes image data from the imaging system 100 and/or other imaging system and visually presents the processed image data via the one or more output devices 128. Such processing includes processing thoracic and/or other image data and generating a direct rendering that includes at least two emphysema subtypes diffuse emphysema and bullous emphysema. As described in greater detail below, this includes generating a 2D projection image for each subtype, visually highlighting the different subtypes with different color, combining the highlighted images into a single composite image, and displaying the single composite image.

In one non-limiting instance, the rendered intensities for the diffuse emphysema subtype are derived from the local voxel intensity, and the rendered intensities for the bullous emphysema subtype are derived from the local bullae size, wherein bullae contour intensity corresponds to bullae size in that contours corresponding to larger bullae size have greater intensity relative to contours corresponding to smaller bullae size. The intensities of the subtypes are projected onto different two-dimensional (2D) images through projection techniques such as maximum intensity projection (MIP), digital volume rendering (DVR), averaging, or the like, and the projection images are combined and displayed as the composite 2D image which shows both subtype.

The composite 2D image allows for generating a single 2D projection image from volumetric image data in which both diffuse emphysema and bullous emphysema subtypes are concurrently presented visually distinct in a single image. In addition, the rendering may serve as a navigation image to salient locations in the volumetric image data, for example, where a point in the single composite image refers to a position in the volumetric image data, and vice versa. The single composite image can be created via automated and/or manual approaches and interactively manipulated (e.g., rotate, zoom, pan, window/level, etc.), filmed, archived, etc.

Figure 2:
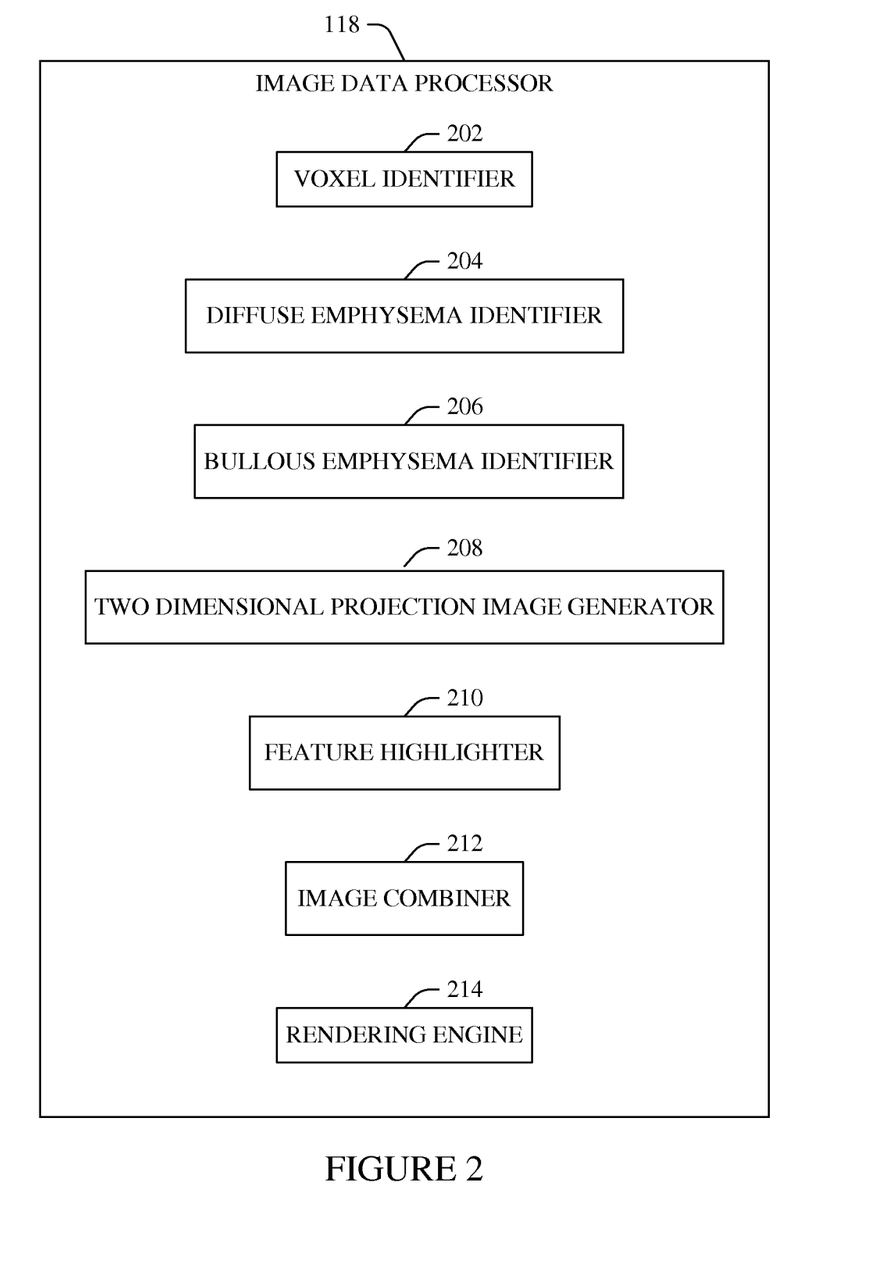
FIG. 2 illustrates an example of the image data processor.

FIG. 2 schematically illustrates an example of the image data processor 118.

A voxel identifier 202 identifies voxels of volumetric image data corresponding to predetermined anatomical tissue. The voxel identifier 202 can employ known and/or other approaches, including automatic and/or semi-automatic (with user interaction) approaches. The volumetric image data can be generated by the imaging system 100 and/or other imaging system. For this example, the predetermined anatomical tissue is lung tissue. However, the predetermined anatomical tissue can be other tissue.

A diffuse emphysema identifier 204 identifies voxels of the predetermined anatomical tissue that correspond to diffuse emphysema. For example, the bullous emphysema identifier 204 can compare voxels of the lung with a threshold and identify voxels having Hounsfield values below the threshold as voxels corresponding to diffuse emphysema.

A bullous emphysema identifier 206 identifies voxels of the predetermined anatomical tissue that correspond to bullous emphysema. For example, the bullous emphysema identifier 206 can cast search rays through the voxels, with each ray terminating when it reaches a predetermined Hounsfield threshold. The bullous emphysema identifier 206 can then determine a length of each ray and identify voxels having a length corresponding to a predetermined size (e.g., those in the upper quartile or 75%) as voxels corresponding to bullous emphysema. The bullous emphysema identifier 206 generates a volume of data with the identified voxels.

A two-dimensional (2D) projection image generator 208 generates 2D projection images based on the identified voxels. For example, the two-dimensional (2D) projection image generator 208 can generate a 2D diffuse emphysema projection images and a 2D bullous emphysema projection image. With the 2D bullous emphysema projection image, the intensity of the contours of the bullae correspond to bullae size in that larger bullae have contours with greater intensity relative to smaller bullae which have contours with less intensity. This can be seen in FIG. 5, which shows a cross-sectional (axial) view of different size bullae in which a contour 502 of a larger bulla has greater intensity than a contour 504 of a smaller bulla. The two-dimensional (2D) projection image generator 208 can generate MIP, DVR, average, etc. 2D projection images.

A feature highlighter 210 highlights the voxels corresponding to diffuse emphysema in the 2D diffuse emphysema projection image and the voxels corresponding to bullous emphysema in the 2D bullous emphysema projection image using different highlighting indicia. For example, the feature highlighter 210 can highlight the voxels corresponding to diffuse emphysema in the 2D diffuse emphysema projection image using one color and highlight the voxels corresponding to bullous emphysema in the 2D diffuse emphysema projection image using a second different color. In another instance, different gray scales can be used. In another instance, cross hatching, outlining, and/or other indicia can be used.

An image combiner 212 combines the highlighted 2D emphysema projection images. For example, the image combiner 212 can add corresponding pixels values of the highlighted 2D emphysema projection image and generate a single composite image. This includes adding the color values (e.g., RGB, gray scale, etc.) assigned by the feature highlighter 210 for each pixel. The addition can be a straight or weighted addition.

A rendering engine 214 renders the single composite image via a display. The combined single composite image can be displayed along with or in alternative to the original volumetric image data, one or both of the 2D emphysema projection image, one or both of the highlighted 2D emphysema projection images, an/or one or more other images.

The single composite image can be displayed in an interactive graphical user interface (GUI), which includes tools that allow a user to manipulate the rendered single composite image. For example, the tools may allow the user to rotate, pan, zoom, window/level, etc. the rendered single composite image. The tools also allow for saving, filming, etc. images.

The single composite image may also be interactively coupled with the volumetric image data such that selecting a point in the single composite image invokes presentation of a slice-wise or other view of the corresponding location in the volumetric image data and vice versa. This can be achieved in such a manner that each pixel in the 2D single composite image refers to the position of the voxel in the volumetric image data that contributed with the highest opacity along the view line of the rendered pixel.

Figure 3:
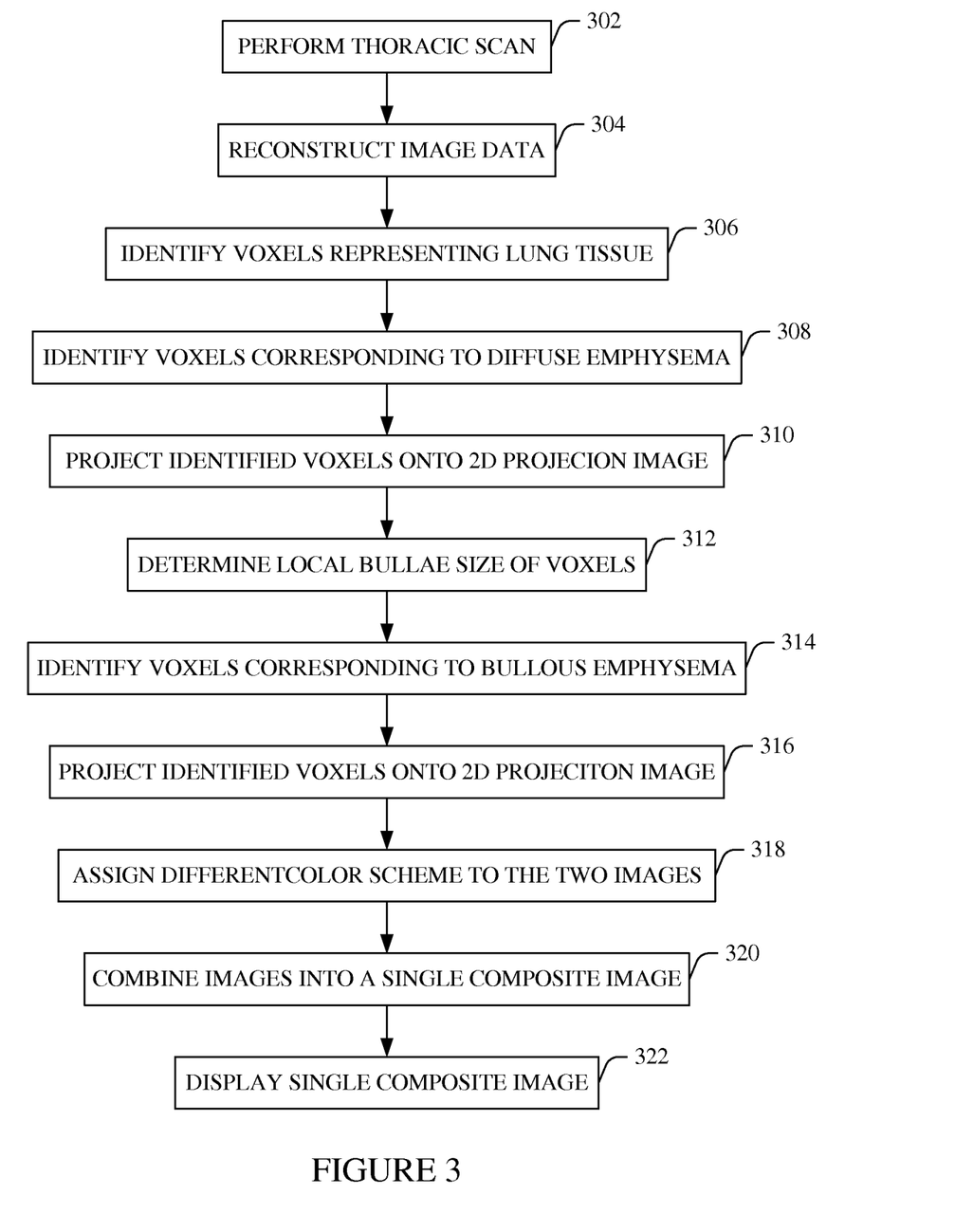
FIG. 3 illustrates an example method for generating a color coded composite image showing both diffuse and bullous emphysema.

FIG. 3 illustrates an example method.

It is to be appreciated that the ordering of the acts is not limiting. As such, other orderings are contemplated herein. In addition, one or more acts may be omitted and/or one or more additional acts may be included.

At 302, a thoracic scan of a subject is performed.

At 304, the acquired data is reconstructed, generating volumetric image data.

Figure 4:
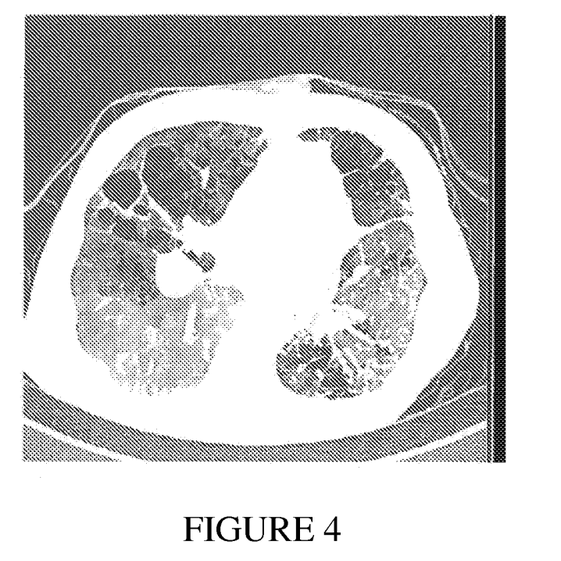
FIG. 4 shows a cross-sectional (axial) view of the lungs in the volumetric image data.

At 306, voxels representing the lung are identified in the volumetric image data. This can be through automated and/or manual segmentation approaches and/or otherwise. FIG. 4 shows a cross-sectional (axial) view of the lungs in the volumetric image data.

At 308, voxels of the lung having a Hounsfield value below a predetermined threshold are identified as diffuse emphysema.

At 310, the diffuse emphysema voxels are projected on to a two-dimensional image. This can be achieved through projection approaches such as MIP, DVR, averaging, etc.

At 312, for the voxels of the lung, the local bullae size is estimated. This can be achieved by casting out a number of three-dimensional (3D) distributed search rays. Each ray terminates when it reaches a predetermined Hounsfield threshold, and its length is recorded.

At 314, from the ray lengths, voxels satisfying a pre-determined size are identified as bullae size, and a contour image is generated in which an intensity of a contour of a bulla corresponds to its size such an intensity of a contour for a larger bulla is higher than an intensity of a contour for a smaller bulla.

Figure 5:
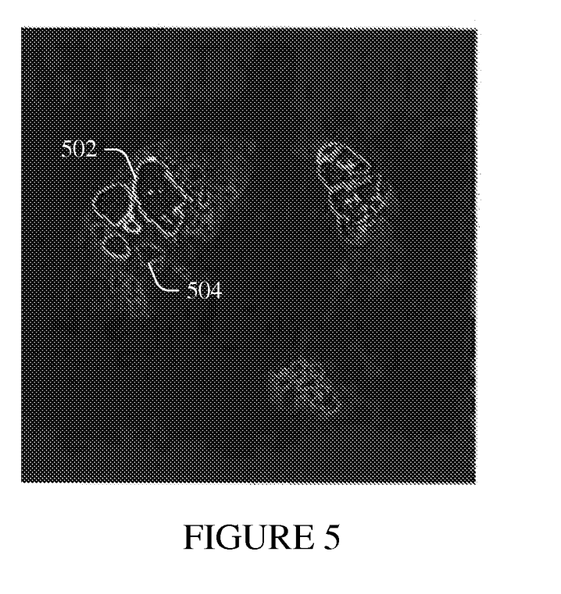
FIG. 5 shows a cross-sectional (axial) view, corresponding to the view of FIG. 4, of different size bullae in which a contour of a larger bullas is greater than a contour of a smaller bulla.

Again, this is shown in FIG. 5, which shows a cross-sectional (axial) view of different size bullae in which the contour 502 of the larger bulla has greater intensity than the contour 504 of the smaller bulla.

At 316, the bullous emphysema voxels are projected on to a two-dimensional image. This can be achieved through projection approaches such as MIP, DVR, averaging, etc.

At 318, the diffuse emphysema voxels of the diffuse emphysema image are assigned one color, and the bullous emphysema voxels of the bullous emphysema image are assigned a second different color.

Figure 6:
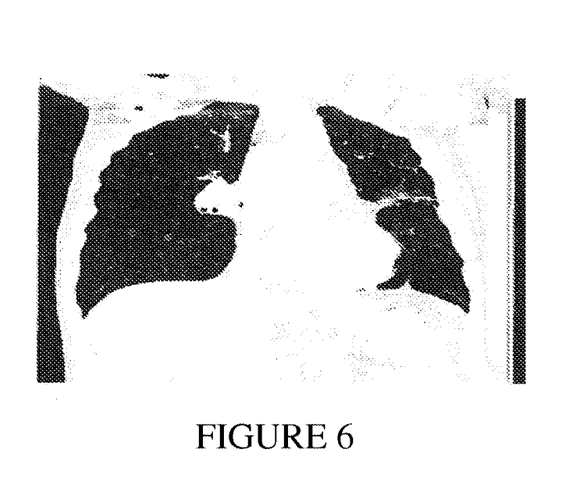
FIG. 6 shows a 2D projection image of the lungs.
Figure 7:
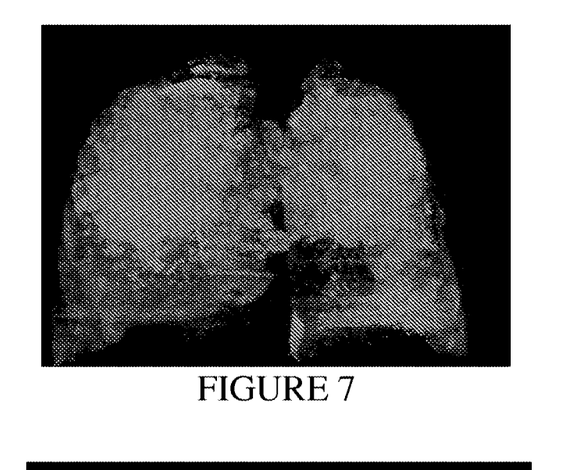
FIG. 7 shows a highlighted 2D diffuse emphysema projection image in which diffuse emphysema is highlighted with a first color.

FIG. 6 shows a 2D diffuse projection image of the lungs. FIG. 7 shows a highlighted 2D diffuse emphysema projection image in which diffuse emphysema is highlighted with a first color (gray scale here, but another color can be used).

Figure 8:
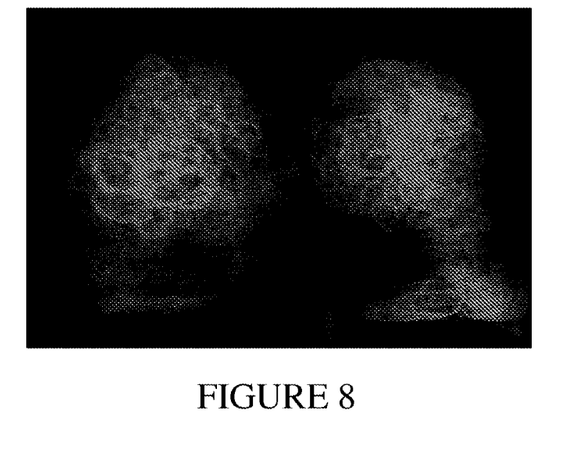
FIG. 8 shows a highlighted 2D bullous emphysema projection image in which bullous emphysema is highlighted with a second different color.

FIG. 8 shows a highlighted 2D bullous emphysema projection image in which bullous emphysema is highlighted with a second different color (gray scale here, but another color can be used). In FIG. 8, the intensity is not only derived from the local voxel intensities, but also from the local bullae size, as discussed herein.

At 320, the two colored images are combined into a single composite image.

At 322, the single composite image is displayed. As discussed herein, the single composite image along with the original volumetric image data in an interactive mode in which each pixel in the 2D rendering is linked to a corresponding position in the volumetric image data that contributed with the highest opacity along the view line of the rendered pixel.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An image data processor, comprising:
   a bullous emphysema identifier that processes voxels of the volumetric image data and identifies voxels corresponding to bullous emphysema; and
   a two dimensional projection image generator that generates a 2D bullous emphysema projection image based on the voxels corresponding to bullous emphysema,
   wherein an intensity of a contour of a bulla in the 2D bullous emphysema projection image is based on a size of the bulla.

2. The image data processor of claim 1, further comprising:
   a diffuse emphysema identifier that processes voxels of volumetric image data and identifies voxels corresponding to diffuse emphysema,
   wherein two dimensional projection image generator generates a 2D diffuse emphysema projection image based on the voxels corresponding to diffuse emphysema.

3. The image data processor of claim 2, further comprising:
   a feature highlighter that highlights the bullous emphysema in the 2D bullous emphysema projection image using first indicia and highlights the diffuse emphysema in the 2D diffuse emphysema projection image using second different indicia;
   an image combiner that combines the 2D diffuse emphysema projection image and the 2D bullous emphysema projection image into a single composite 2D projection image; and
   a rendering engine that visually presents the single composite 2D projection image.

4. The image data processor of claim 1, wherein the bullous emphysema identifier identifies voxels corresponding to bullae by casting rays through the image data with each ray terminating when it reaches a predetermined Hounsfield threshold and determining a length of each ray, and wherein the bullous emphysema identifier identifies voxels satisfying a pre-determined size as corresponding to bullae.

5. The image data processor of claim 4, wherein the bullous emphysema identifier creates a volume corresponding to the identified bullae.

6. The image data processor of claim 5, wherein the two dimensional projection image generator generates the 2D bullous emphysema projection image by projecting the volume corresponding to the identified bullae onto the 2D bullous emphysema projection image based on the voxels corresponding to bullous emphysema.

7. The image data processor of claim 6, wherein an intensity of a contour of a larger bulla is higher than an intensity of a contour of a smaller bulla in the 2D bullous emphysema projection image.

8. The image data processor of claim 3, wherein the rendering engine visually presents the single composite 2D projection image along with the volumetric image data.

9. The image data processor of claim 8, wherein the rendering engine links the single composite 2D projection image and the volumetric image data such that selection of a point in the single composite image invokes presentation of a slice-wise view of the corresponding location in the volumetric image data and selection of a point in the volumetric image data invokes presentation of a slice-wise of the corresponding location in the single composite image.

10. A method, comprising:
identifying voxels of volumetric image data corresponding to bullous emphysema; and
generating a 2D bullous emphysema projection image based on the voxels corresponding to bullous emphysema, including local voxel intensity and bullae size,
wherein an intensity of a contour of a bulla in the 2D bullous emphysema projection image is based on a size of the bulla.

11. The method of claim 10, further comprising:
identifying voxels of volumetric image data corresponding to diffuse emphysema;
generating a 2D diffuse emphysema projection image based on the voxels corresponding to diffuse emphysema;
highlighting the diffuse emphysema in the 2D diffuse emphysema projection image using second indicia;
highlighting the bullous emphysema in the 2D bullous emphysema projection image using first indicia;
combining the 2D projection images, creating a single composite 2D projection image; and
visually displaying the single composite 2D projection image.

12. The method of claim 10, further comprising:
casting rays through the image data with each ray terminating when it reaches a predetermined Hounsfield threshold;
determining a length of each ray; and
identifying voxels satisfying a pre-determined size as corresponding to bullae.

13. The method of claim 12, further comprising:
creating a volume corresponding to the identified bullae.

14. The method of claim 13, further comprising:
projecting the volume corresponding to the identified bullae onto the 2D bullous emphysema projection image based on the voxels corresponding to bullous emphysema.

15. The method of claim 14, wherein an intensity of a contour of a larger bulla is higher than an intensity of a contour of a smaller bulla in the 2D bullous emphysema projection image.

16. The method of claim 11, further comprising:
visually presenting the single composite 2D projection image along with the volumetric image data.

17. The method of claim 16, wherein the rendering engine links the single composite 2D projection image and the volumetric image data such that selecting a point in the single composite image invokes presentation of a slice-wise of the corresponding location in the volumetric image data and selecting a point in the volumetric image data invokes presentation of a slice-wise of the corresponding location in the single composite image.

18. A non-transitory computer readable storage medium encoded with computer readable instructions, which, when executed by a processor, cause the processor to:
identify voxels of volumetric image data corresponding to bullous emphysema; and
generate a 2D bullous emphysema projection image based on the voxels corresponding to bullous emphysema,
wherein an intensity of a contour of a bulla in the 2D bullous emphysema projection image is based on a size of the bulla.

19. The non-transitory computer readable storage medium of claim 18, the executed instructions further cause the processor to:
cast rays through the image data with each ray terminating when it reaches a predetermined Hounsfield threshold;
determine a length of each ray;
identify voxels satisfying a pre-determined size as corresponding to bullae;
create a volume corresponding to the identified bullae; and
project the volume corresponding to the identified bullae onto the 2D bullous emphysema projection image based on the voxels corresponding to bullous emphysema.

20. The non-transitory computer readable storage medium of claim 19, wherein an intensity of a contour of a larger bulla is higher than an intensity of a contour of a smaller bulla in the 2D bullous emphysema projection image.

* * * * *